United States Patent [19]

Oberheide

[11] Patent Number: 4,988,930
[45] Date of Patent: Jan. 29, 1991

[54] PLURAL MOTOR FAN SYSTEM WITH IMPROVED SPEED CONTROL

[76] Inventor: George C. Oberheide, 4401 Deacon Ct., Troy, Mich. 48098

[21] Appl. No.: 514,238

[22] Filed: Apr. 25, 1990

[51] Int. Cl.[5] ............................................. H02P 7/68
[52] U.S. Cl. ....................................... 318/82; 318/42; 318/50; 318/59
[58] Field of Search ....................... 318/41, 42, 49, 50, 318/59, 66, 67, 68, 79, 80, 82, 83, 111, 112, 113, 244, 245, 246, 249

[56] References Cited

U.S. PATENT DOCUMENTS

| | | | |
|---|---|---|---|
| 1,763,537 | 6/1930 | Prantl | 318/91 |
| 2,635,218 | 4/1953 | Dupy | 318/82 |
| 2,763,823 | 9/1956 | Symes | 318/8 |
| 3,017,553 | 1/1962 | Homan | 318/737 |
| 3,146,387 | 8/1964 | Levy et al. | 318/112 |
| 3,381,200 | 4/1968 | Edwards | 318/112 |
| 3,469,166 | 9/1969 | Burby . | |
| 3,678,357 | 7/1972 | Swanke et al. | 318/245 |
| 3,826,958 | 7/1974 | Cvetnic | 318/113 |
| 4,910,790 | 3/1990 | Kershaw . | |

FOREIGN PATENT DOCUMENTS

2122132 8/1972 France .
2041677 9/1980 United Kingdom .

*Primary Examiner*—Bentsu Ro
*Attorney, Agent, or Firm*—Cushman, Darby & Cushman

[57] ABSTRACT

A two motor assembly for driving two fan blades to move air through a heat exchanger comprising a first two speed DC motor comprising magnets for establishing a fixed magnetic field, an armature rotor rotatable to drive a first fan blade, a multiplicity of armature coil turns on the armature rotor, a commutator assembly on the armature rotor, and sets of brushes including a tap brush cooperating with the commutator assembly to alternatively operate the two speed DC motor (1) is a first speed mode wherein (A) a system voltage is applied and distributed across all of the multiplicity of armature coil turns to produce a net total back EMF and armature reaction interacting with the magnetic field to cause the armature rotor to rotate in the first speed mode and (B) a tap voltage intermediate the system voltage reduced across a predetermined number of armature coil turns less than all of the multiplicity of armature coil turns is provided through the tap brush and (2) a different second speed mode. Circuitry is provided for alternatively (1) applying the tap voltage across the armature coil of a second DC motor so as to operate the second DC motor in a first speed mode when said first two speed DC motor is operated in the first speed mode thereof and (2) applying the system voltage across the armature coil of the second DC motor so as to operate the second DC motor in a second speed mode when the first two speed DC motor is operated in the second speed mode.

20 Claims, 6 Drawing Sheets

PLURAL MOTOR FAN SYSTEM WITH IMPROVED SPEED CONTROL

BACKGROUND AND FIELD OF THE INVENTION

This invention relates to a plural motor fan system. More particularly, the invention relates to speed control of a two motor fan system useful for moving air through a heat exchanger in a motor vehicle engine cooling system, in which each motor drives a respective set of fan blades at more than one selectable speed.

In cooling systems for motor vehicles, it is known to provide a dual fan assembly, each fan being mounted on a respective shaft of a separate direct-current ("DC") motor. The motors are independently connected to their power source. Each such motor includes only a single armature coil winding, and drives a shaft which is mechanically unconnected to that driven by the other motor. Each fan rotates at a rate corresponding to the speed of the motor which is driving the shaft connecting to the fan. Different combinations of motor speed may be selectively chosen to suit the application environment. For instance, both motors may operate at a high speed, or low speed; it is not necessary that the high speed of the two motors be equal, or that the low speed of the two motors be equal.

To vary the speed of the motors in such a system, it has been known to vary the voltage that is applied to each motor with external conventional means, which can provide a selectable voltage drop from a power source. The external means can be constructed with conventional electronic parts or resistors. But the bulk of such external means creates packaging difficulties for it must be packaged separately. Also, the component cost of the external means adds to system cost; additionally, power conversion is made less efficient by such conventional external means; the connection between the motor and the external power source is also made more complex. Where the external means uses a resistor, problems relating to intrinsic characteristics of resistors cause certain disadvantages. Resistors, by nature, operate at extremely high temperature; resistors have shown a low reliability in a motor vehicle environment; and resistors are inefficient as power is wastefully dissipated. Also, in such a system, because the two motors are electrically independent of each other, a separate means for radio frequency interference suppression is required for each motor.

Alternatively, to vary the speed of the motors in such a system, it has also been known to include a selectably connected resistor internal to each motor. That arrangement presents packaging difficulties associated with the internal resistor and with the additional heat that is dissipated internally. The disadvantages intrinsic to the use of resistors as noted above are also a problem. And separate means for radio frequency suppression are still required.

Another type of plural motor fan system in the prior art for moving air through a heat exchanger in a motor vehicle cooling system connects two motors, each still including only a single armature coil winding, electrically in series with each other, to obtain a respective motor speed slower than that of the same motor when the external applied voltage is applied in full across each motor's armature coil winding. That system, however, provides an inflexible low to high speed ratio for each motor. If two such equal windings in similar motors are placed in series driving equal loads, then one-half of the total applied voltage is dropped across each motor. Attempts to adjust the voltage drop of one motor to affect the performance of the other motor will have a detrimental effect on the system when both motors run in parallel. Given a constant designed total motor power in the parallel mode, maximized low speed power is obtained with equal power motors. Even so, with one-half voltage on a fan system, the fan power is reduced to a generally unsuitably low power level for automotive applications. Attempts to use unequal power motors would cause the respective power differences between the two motors to be reversed when changing between series and parallel operation. Furthermore, that would cause a reduction of the low speed total power with respect to total high speed power. A desirable low speed voltage for each motor would be one that is equal to that of each other and also intermediate of the full and half value of the voltage supplied by the motor vehicle.

Furthermore, a minimum of three switches (e.g., SPST relays) are required to implement that prior art system; and separate switches are required which lead into each motor, thus complicating the prior art system's electrical connection. It is also not possible in that system to have one motor running at its high speed while the other is running at its low speed.

In the motor art generally, it has been known to construct a dual wind two speed motor by winding two armature coil windings on a common rotor, and to selectively switch between a connection including both armature coil windings in series to obtain a low motor speed, and a connection including just one armature coil winding to obtain a higher motor speed. One such motor disclosed in commonly assigned U.S. Pat. No. 4,910,790, Mar. 20, 1990. Similarly, the following references each discloses a motor of that type: (1) Published British Patent Application No. 2,041,677; and (2) French Patent No. 2,122,132.

Though no prior art plural motor fan system for motor vehicles is heretofore known which includes two separate dual wind two speed motors which independently drive a respective set of fan blades, such a system would nevertheless have numerous disadvantages. With two such dual wind motors driving respective loads, the number of motor parts is duplicative and the cost is high, as each motor is a complete multi-speed motor in itself. There is still a need to provide a two motor assembly for driving two fan blades to move air through a heat exchanger for an automotive engine which does not suffer from one or more of the disadvantages noted above.

It is an object of the present invention to provide a two motor assembly which will fulfill the above-described need. In accordance with the principles of the present invention, this objective is achieved by providing a two motor assembly of the type described which includes a first two speed DC motor of the type having a first fixed magnetic field and an armature rotor rotatable to drive first fan blades. A multiplicity of armature coil turns are provided on the armature rotor along with a commutator assembly which is electrically connected with the multiplicity of armature coil turns. A plurality of brushes including a tap brush cooperate with the commutator assembly to alternatively operate the plural speed DC motor (1) in a first speed mode wherein (A) a system voltage is applied across all of the multiplicity of armature coil turns to produce a net total back electro-motive force and armature reaction interacting with the first magnetic field to cause the armature rotor to rotate in the first speed mode and (B) a tap voltage intermediate the system voltage reduced across a predetermined number of armature coil turns less than all of the multiplicity of armature coil turns is provided through the tap brush and (2) a different second speed mode. A second DC motor is provided which includes a rotor for driving second fan blades and cooperating field and armature coils for rotating the rotor. Circuitry is provided for alternatively (1) applying the tap voltage across the armature coils of the second DC motor so as to operate the second DC motor in a first speed mode when the first two speed DC motor is operated in the first speed mode thereof and (2) applying a system voltage across the armature coils of the second DC motor so as to operate the second DC motor in a second speed mode when the first two speed DC motor is operated in the second speed mode.

Another object of the present invention is the provision of a fan system for use in moving air through a heat exchanger for an automotive engine which includes a shroud adapted to be operatively associated with the heat exchanger so as to receive air after it has passed through the heat exchanger. The shroud has discharge openings therein for allowing air received therein which has passed through the heat exchanger to be discharged therefrom. First and second fan blades are rotatably mounted within the shroud to effect a flow of air into the shroud through the heat exchanger and a flow of air out of the shroud through the discharge openings and a two motor assembly of the type previously described is provided for driving the first and second fan blades.

Preferably, the second motor is a simple one speed DC electric motor and the circuitry is simplified to include only two switches, which are capable of operating the two motors together alternatively in their first speed modes or their second speed modes. However, the arrangement permits other different mode operations where the shroud which associates the fan blades with the heat exchanger provides separate flow paths for each motor and fan blade combination.

The invention also contemplates the utilization of a second similar two speed DC motor as the second motor in which case it becomes possible to provide each motor with three operating speed modes rather than two and many more where separate shroud paths are provided.

Another object of the present invention is the provision of a two motor system of the type described which is simple in construction, effective in operation, and economical to manufacture and maintain.

These and other objects of the present invention will become more apparent during the course of the following detailed description and appended claims.

The invention may best be understood with reference to the accompanying drawings wherein an illustrative embodiment is shown.

DETAILED DESCRIPTION OF PREFERRED EMBODIMENTS

Figure 1:
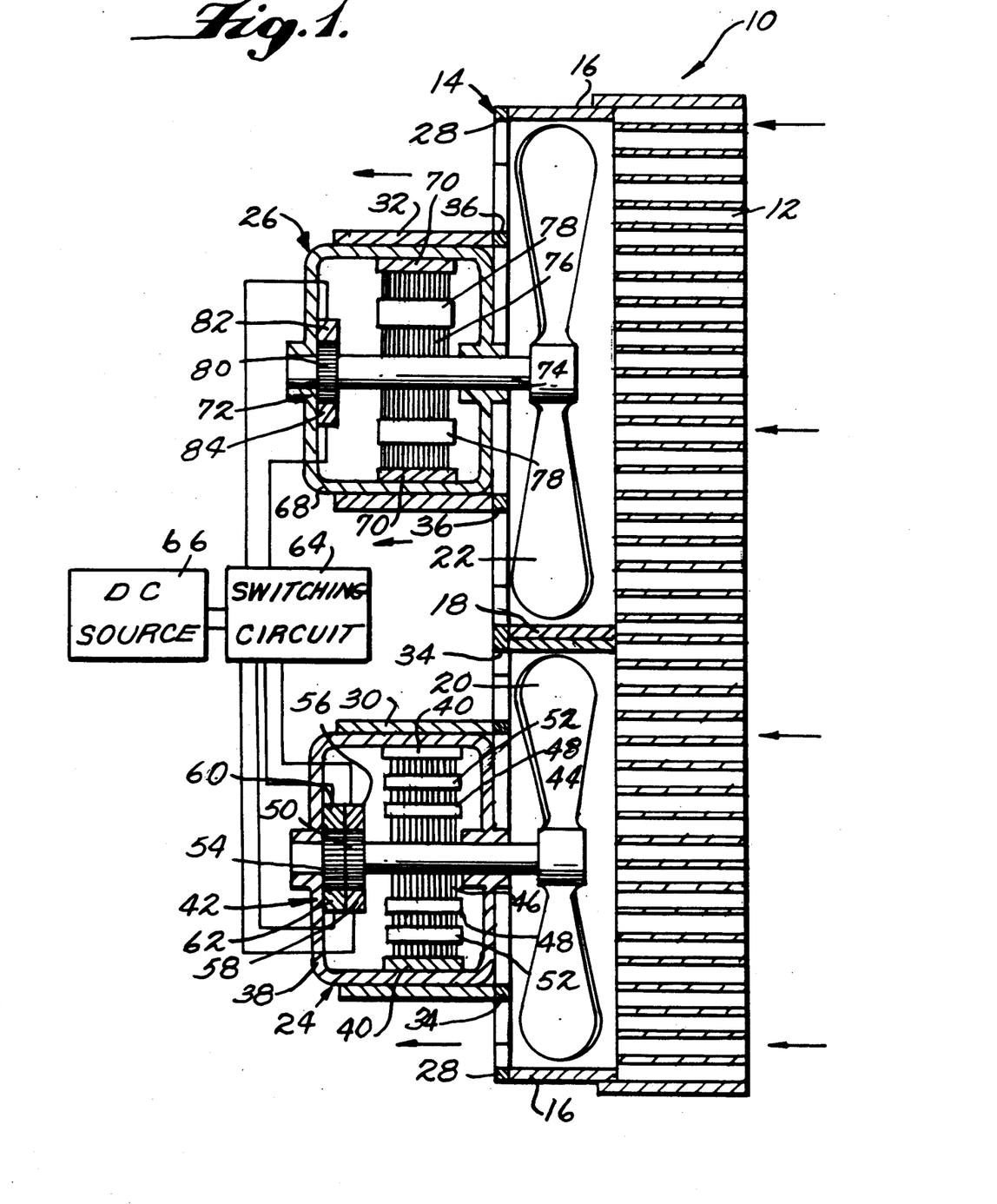
FIG. 1 is a somewhat schematic vertical sectional view of a preferred dual motor fan system embodying the principles of the present invention.

Referring now more particularly to the drawings, there is shown in FIG. 1 a plural fan system, generally indicated at 10, which embodies the principles of the present invention. The plural fan system 10 is adapted to cooperate with a heat exchanger 12 of the type utilized in conjunction with automotive engines, such as, for example, in the cooling system thereof. The plural fan system 10 of the present invention includes a shroud assembly, generally indicated at 14, which consists essentially of a generally rectangular peripheral wall 16 which is adapted to cooperate with the periphery of the heat exchanger 12 so as to receive therein air passing through the heat exchanger. In the embodiment shown, the shroud assembly includes a pair of divider walls 18 which divide the space within the peripheral wall 16 of the shroud assembly into a first space within which is mounted a first set of fan blades 20 and a separate second space within which is mounted a second set of fan blades 22.

FIG. 1 illustrates somewhat schematically a first two speed DC motor, generally indicated at 24, for driving the first fan blades 20 and a second DC motor, generally indicated at 26, for driving the second fan blades 22. As shown, the shroud assembly 14 includes a rear wall 28 which is fixed along its periphery to the peripheral wall 16 and along a central portion with the divider walls 16. The rear wall 28 includes a central opening communicating with the first space having a first tubular wall 30 extending rearwardly thereof within which the first motor 24 is mounted. In the drawings, the diameter size of the tubular wall 30 is exaggerated in order to provide space within which to clearly schematically illustrate all the major components of the motor 24. Similarly, a second tubular wall 32 extends from a second central opening in the rearward wall 28 and serves to receive the second motor 26. As shown, the rear wall 28 is provided with a first series of annularly spaced openings 34 which extend around the tubular wall 30 and provide discharge openings for the flow of air from the first space. Similarly, a second series of annularly spaced discharge openings 36 are mounted in the rear wall 28 in surrounding relation to the tubular wall 32 to provide discharge openings for the flow of air from the second shroud space.

In accordance with the principles of the present invention, the first motor 24 is a two speed DC motor. Preferably, the motor is of the type embodied in commonly assigned U.S. Pat. No. 4,910,790, the disclosure of which is hereby incorporated by reference into the present specification. The motor 24 is schematically illustrated in the drawings to include a housing 38 having a series of permanent magnets 40 spaced along the inner periphery thereof which defines a fixed magnetic motor field of the first motor. An armature rotor assembly, generally indicated at 42, is rotatably mounted in the housing 38 and includes a shaft 44 suitably journalled in the housing 38. The first fan blades 20 are fixed to the end of the shaft 44 extending into the first space provided by the shroud assembly 14. A series of armature laminations 46 are fixed to the shaft 44 and have a first predetermined number of armature coil turns 48 wound thereon which are electrically connected with a first commutator 50 fixed to the shaft 44 and forming a part of the armature rotor assembly 42. A second number of armature coil turns 52 are wound on the armature laminations 46 which are electrically connected to a second commutator 54. As shown, a first set of two brushes 56 and 58 is mounted within the housing 38 in cooperating relation with the first commutator 50 and a second set of two brushes 60 and 62 is mounted within the housing 38 in cooperating relation with the second commutator 54. The first and second sets of brushes are connected electrically with a switching circuit, generally indicated at 64, driven by a DC source 66, such as the automotive battery.

The second motor 26 may be any type of DC motor including brushless DC motors and the like. The second motor 26 schematically illustrated in FIG. 1 includes a housing 68 which is fixed within the tubular wall 30 and carries a series of permanent magnets 70 on the interior thereof so as to define a second magnetic field therein. Rotatably mounted in the housing 68 is an armature rotor assembly, generally indicated at 72, which includes a shaft 74 suitably journalled in the housing 68 and fixed to the second fan blades 22. The armature rotor assembly includes a series of armature laminations 76 on which are wound a multiplicity of coil turns 78 which are, in turn, electrically connected with a commutator 80 forming a part of armature rotor assembly 72. As shown, a set of two brushes 82 and 84 are mounted within the housing 68 in cooperating relation with the commutator 80 which, in turn, are connected in the electric circuit 64.

Figure 2:
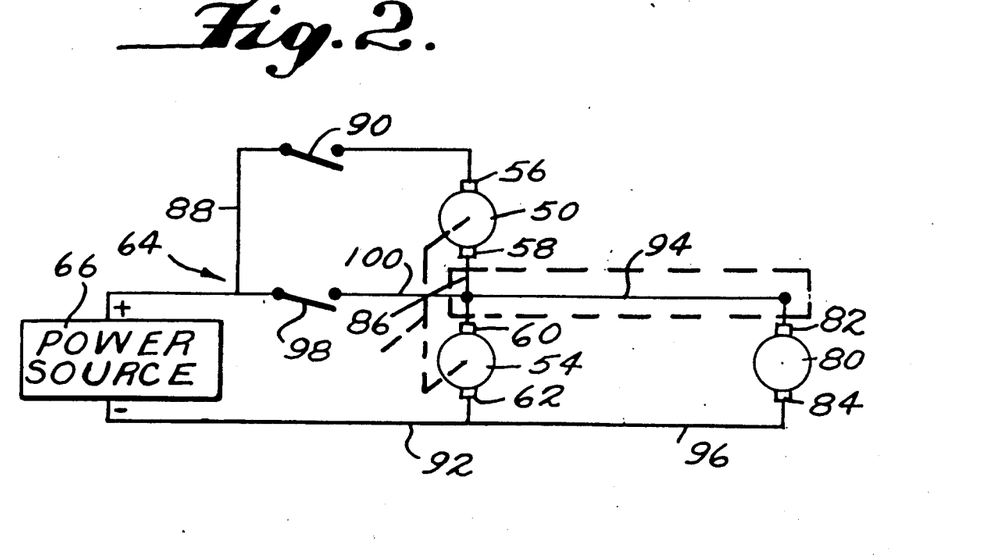
FIG. 2 is a schematic wiring diagram showing a preferred switching circuit for the system of FIG. 1.

A characteristic of the dual commutator and dual sets of brushes, embodied in the dual speed motor 24 is that the brush 58 of the first set constitutes a tap brush and the brush 60 of the second set constitutes a tap brush. The dual speed motor 24 is connected to operate in a first speed mode by electrically connecting the two tap brushes 58 and 60 in series, as shown in FIG. 2, as by a lead 86 and applying system voltage from the source 66 (e.g., 12 volts) across the brushes 56 and 62. This is accomplished as shown in the circuitry in FIG. 2 by a lead 88 connected from the positive terminal of the power source 66 to the brush 56 within which is embodied a first switch 90 and a return lead 92 extending from the brush 60 to the negative terminal of the power source 66.

It is important to note that the tap brushes 58 and 60 provides a means which is operable during the first speed mode to provide a tap voltage, intermediate the system voltage, reduced across the predetermined number of first armature coil turns 48 which are electrically connected with the first commutator 50. Preferably, the number of first armature coil turns 48 connected with the first commutator 50 is less than half of the total number of armature coil turns 48 and 52 connected to both the first and second commutators 50 and 54 or the entire multiplicity of armature coil turns provided. In a preferred embodiment, the predetermined number of armature coil turns 48 which are connected to the first commutator 50 is approximately one-fourth of the total number of the entire multiplicity of armature coil turns.

The tap voltage which is provided by tap brushes 58 and 60 in the first speed mode of operation of the first motor 24 is applied across the armature coil turns 78 of the second motor 26 as by a lead 94 between the tap brushes 58 and 60 and the first brush 82 and a return lead 96 between the second brush 84 and the return lead 92 so as to cause the second motor 26 to operate in a first speed mode.

The circuitry 64 also includes a second switch 98 which is connected within a lead 100 leading from the positive pole of the power source 66 to the tap brush 60 of the second set of brushes. When the switch 98 is closed to achieve the second speed mode of operation of the first motor 24, the switch 90 is open so that the system voltage is applied across the remaining number of second armature coil turns 52 which are electrically connected with the second commutator 54. When the first motor 24 is operating in its second speed mode, the leads 94 and 96 which are connected with the brushes 82 and 84 of the second motor 26 also serve to apply system voltage across the armature coil turns 78 of the second motor 26 distributed thereto by commutator 80 so as to cause it to operate in a second speed mode.

The motor speed of each mode is an inverse function of the number of coil turns cutting the magnetic flux and generating an internal voltage or back-electromotive force (EMF). Back-EMF opposes the terminal voltage applied to the motor effectively reducing the armature current flowing. In the preferred example, the dual speed motor 24 has an exemplary twelve armature coil turns 52 connected with the second commutator 54 and predetermined four armature coil turns 48 connected with the first commutator 50. When the switch 98 is closed, to connect the system voltage across the twelve turns 52 through brushes 60 and 62 for distribution by the commutator 54, the first motor 24 operating in its second speed mode has an exemplary no-load speed of 4000 rpm. The same system voltage is also connected across all of the coil turns 78 of the second motor 26 operating in its second speed mode which has a no-load speed of 6000 rpm. When the switch 98 is opened and the other switch 90 is closed to operate in the first speed mode, the dual speed motor 24 has effectively sixteen armature coil turns 48 and 52 connected across the system voltage and slows down by a factor of 12 over 16 for a no-load speed of 3000 rpm in the first speed mode. At the same time, the four coil turns 48 which are connected across the brush 56 and tap brush 58 through commutator 50 generates an opposing EMF of 4 over 16 or 25% of the terminal voltage of the dual speed motor 24. Therefore, the voltage available to the second motor 26 is reduced by 25% or, in other words, is 75% of the high-speed configuration. Therefore, the second motor slows down by the same ratio and to 4500 rpm when operating in the first speed mode.

The circuit of FIG. 2 is preferred for its simplicity, however, it provides for operation of both motors together either in a first speed mode which is relatively slow (e.g., no-load 3000 rpm and 4500 rpm) and a second speed mode which is relatively fast (e.g., no-load 4000 rpm and 6000 rpm). With this circuitry since both motors are either running or not running together, the divider walls 18 preferably are omitted to reduce costs in the shroud construction. FIGS. 3–6 illustrate variations in the circuitry 64 which enable one or both of the motors to be run separately in which cases the divider walls 18 are required.

Figure 3:
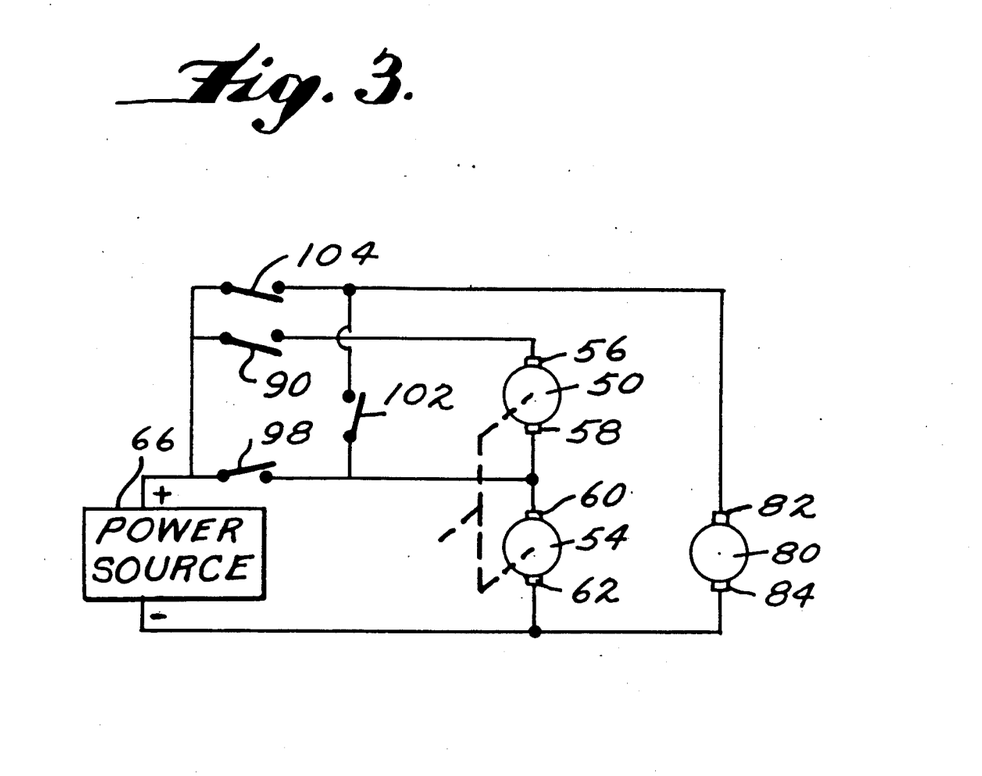
FIGS. 3-6 are schematic wiring diagrams similar to FIG. 2 showing various alternative embodiments of switching circuits for the system of FIG. 1.

As shown, the circuitry of FIG. 3 includes the same two switches 90 and 98 connected as before with the brushes of the first motor 24. But, instead of lead 94, brush 82 of the second motor 26 is connected to the top brush 58 through a switch 102 or alternatively to the positive pole of the source through a switch 104.

With the circuitry of FIG. 3, when the switches 90, 98, 102 and 104 are all open, both motors 24 and 26 are off. When the switch 102 and the switch 98 are closed and the switch 98 and the switch 104 are open, both motors 24 and 26 operate at a low speed. When the switch 102 and the switch 98 are closed and the switch 104 and the switch 90 are open, both motors 24 and 26 operate at a high speed. When the switch 102 and the switch 104 are open and the switch 98 and the switch 104 are closed, both motors also operate at high speed. When the switch 102 and the switch 98 are open and the switch 104 and the switch 90 are closed, motor 24 operates at a low speed while motor 26 operates at a high speed. When the switch 102, the switch 98, and the switch 90 are open and the switch 104 is closed, motor 24 is off and motor 26 operates at a high speed; when the switch 102, the switch 98, and the switch 104 are open and the switch 90 is closed, motor 24 operates at a low speed and motor 26 is off.

Figure 4:
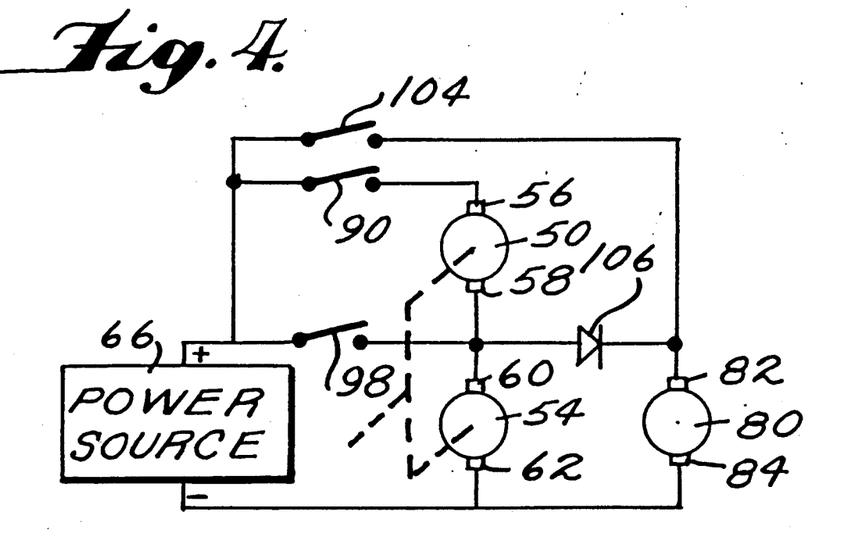

FIG. 4 illustrates a variation of the circuitry of FIG. 3 wherein, instead of providing an alternative connection for the brush 82 to the tap brush 58 through switch 102, an alternative connection to the tap brush 58 is provided through a diode 106.

With the circuitry of FIG. 4, when the switch 90, the switch 104, and the switch 90 are all open, both motors 24 and 26 are off. When the switch 98 and the switch 104 are closed and the switch 90 is open, both motors 24 and 26 operate at a high speed. When the switch 98 is open and the switch 104 and the switch 90 are closed, motor 24 operates at a low speed while motor 26 operates at a high speed. When the switch 98 and the switch 104 are open and the switch 90 is closed, both motor 24 and motor 26 operate at a low speed. When the switch 98 and the switch 90 are open and the switch 104 is closed, motor 24 is off while motor 26 operates at a high speed.

Figure 5:
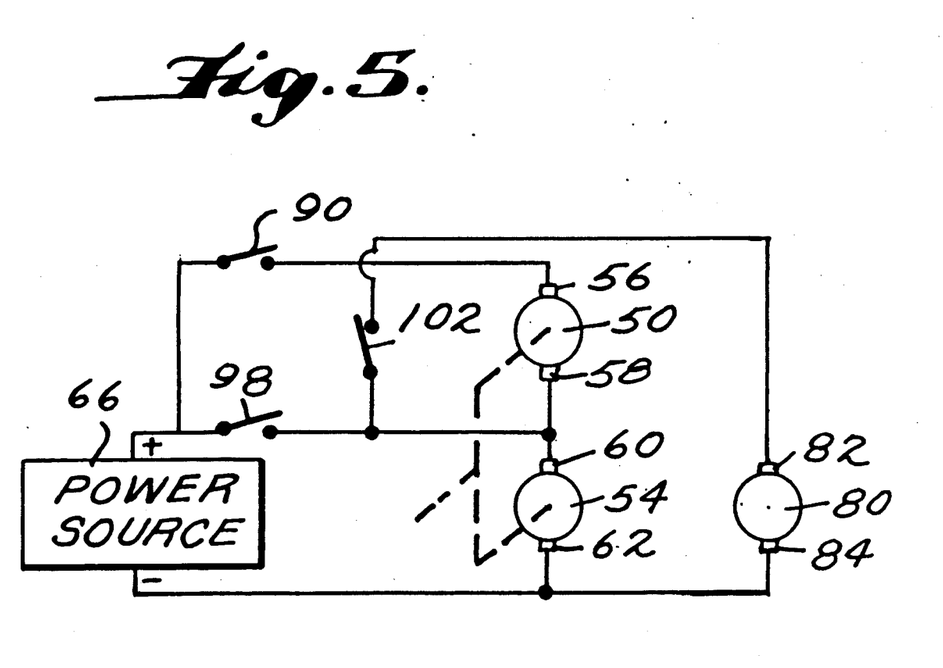

FIG. 5 illustrates another variation of the circuitry of FIG. 3 wherein switch 104 and its alternative connection to the positive source pole is eliminated.

With the circuitry of FIG. 5, when the switch 102, the switch 98, and the switch 90 are all open, both motors 24 and 26 are off. When the switch 102 and the switch 98 are closed and the switch 90 is open, both motor 24 and motor 26 operate at a high speed. When the switch 102 and the switch 90 are closed and the switch 98 is open, both motor 24 and motor 26 operate at a low speed. When the switch 102 and the switch 90 are open and the switch 98 is closed, motor 24 operates at high speed while motor 26 is off. When the switch 102 and the switch 98 are open and the switch 98 is closed, motor 24 operates at low speed while motor 26 is off.

Figure 6:
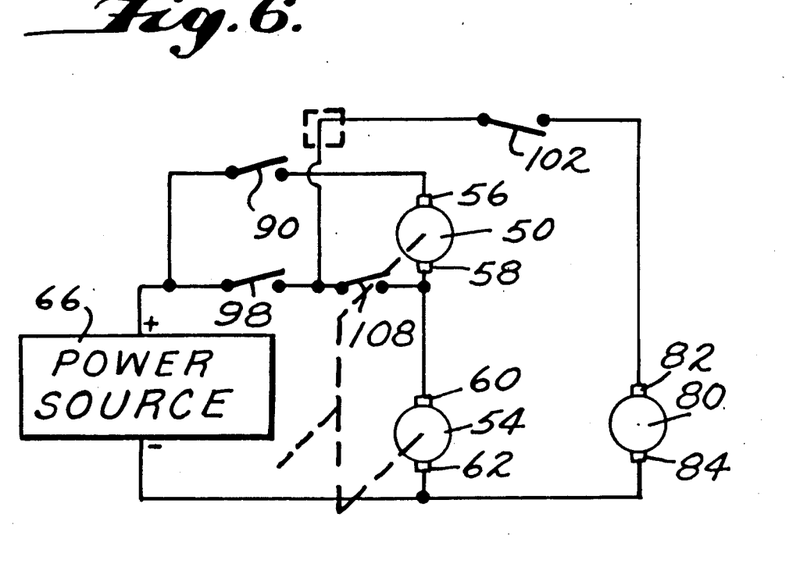

FIG. 6 shows a variation of the circuitry shown in FIG. 5 wherein a switch 108 is provided in series with the switch 102 and the switch 98.

With the circuitry of FIG. 6, when the switch 102, the switch 108, the switch 98, and the switch 90 are all open, both motors 24 and 26 are off. When the switch 102, the switch 108, and the switch 98 are closed and the switch 90 is open, both motors 24 and 26 operate at a high speed. When the switch 102, the switch 98, and the switch 90 are closed and the switch 108 is open, motor 24 operates at a low speed and motor 26 operates at a high speed. When the switch 102, the switch 108, and the switch 90 are closed and the switch 98 is open, both motor 24 and motor 26 operate at a lower speed. When the switch 108 and the switch 98 are closed and the switch 102 and the switch 90 are open, motor 24 operates at a high speed while motor 26 is off. When the switch 90 is closed and the switch 102, the switch 108, and the switch 98 are open, motor 24 operates at a low speed while motor 26 is off. When the first switch 102 and the switch 98 are closed and the switch 108 and the switch 90 are open, motor 24 is off while motor 26 operates at a high speed.

Figure 7:
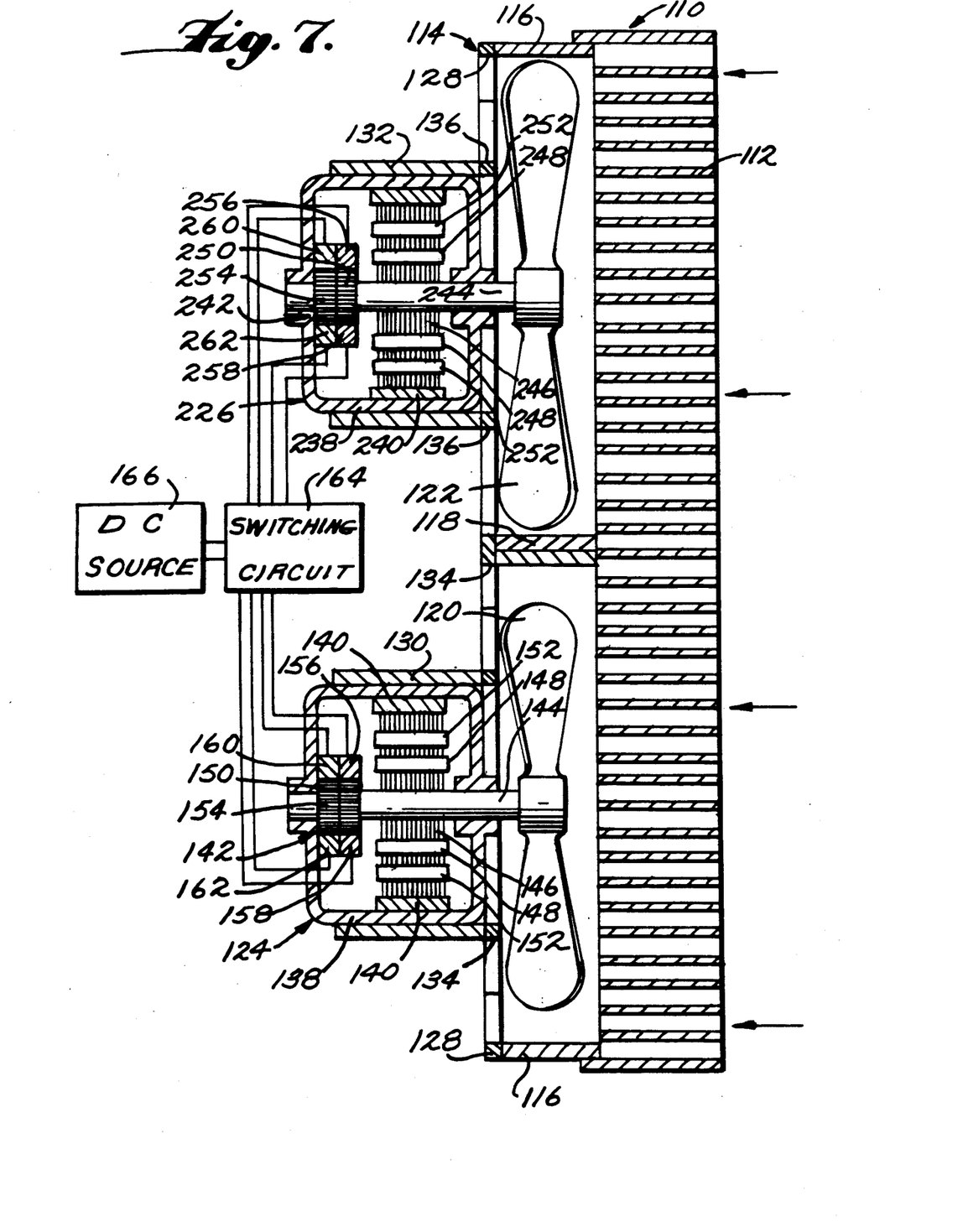
FIG. 7 is a view similar to FIG. 1 showing a variation in a dual motor fan system embodying the principles of the present invention.

FIG. 7 illustrates a dual motor fan system, generally indicated at 110, according to another embodiment of the present invention. The system 110 is like the system 10 previously described except that, in lieu of the second DC motor 24 shown in FIG. 1, a second plural speed DC motor 224 is provided which is constructed like the motor 22. All other components of the system 110 are like those of system 10 and corresponding parts are identified with corresponding reference numerals with a prefix number 1. Since the DC motor 224 is like the motor 22 corresponding parts thereof are given corresponding numerals with a prefix number 2.

Figure 8:
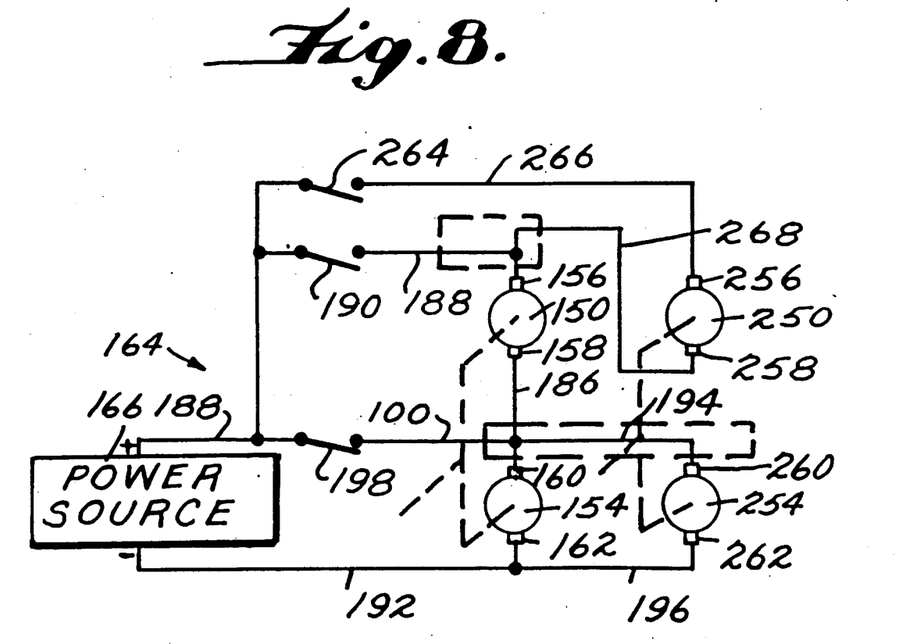
FIG. 8 is a view similar to FIG. 2 showing a preferred switching circuit for the system of FIG. 7.

Referring now, more particularly, to FIG. 8, a preferred circuitry 164 is shown therein for the two motors 124 and 226. In the circuitry 164 shown for the motor 124, the two brushes 158 and 160 constitute tap brushes and are connected together, as before, by a lead 186. Also, as before, the system voltage from the source 166 is applied across brushes 156 and 162 to operate motor 124 with a tap voltage being provided through tap brush 158. The circuitry 164, like the circuitry 64, is preferred because of its simplicity and minimum number of components. It is within the contemplation of the present invention to vary the circuitry 164 with additional switches to achieve a great number of different speeds in which the tap voltage is applied to the second motor 226 through various multiple switch arrangements when set up for two speed operation in the same manner as the motor 124 which, in turn, provides a tap voltage which could be multiply switched for application to the first motor. In the preferred circuitry 164 shown in FIG. 8, the two sets of brushes are not electrically connected in series by a direct lead between brush 258 and brush 260, instead the set of brushes 260 and 262, the cooperating commutator 254 and the remaining second armature coil turns 252 electrically connected thereto are set up in the circuitry in place of the set of brushes 82 and 84 and commutator 80 of second motor 26. When switch 190 is closed and switch 198 is open to cause motor 124 to operate in its first speed mode, the tap voltage provided through tap brush 158 is applied across brushes 260 and 262 and distributed by commutator 256 across the remaining second armature coil turns 252 to provide a total net back EMF and armature reaction interacting with the second magnetic field produced by the permanent magnets 240 to cause the armature rotor assembly 242 to rotate and the second motor 226 to operate in a first speed mode. When the switch 198 is closed and the switch 190 is open, the system voltage is applied across the brushes 260 and 262 to cause the motor 226 to operate in a second speed mode.

Both motors 124 and 226 are operated in a third mode under the control of a switch 264 connected between the second motor brush 256 and the positive terminal of the source 166, as by a lead 266. Brush 258 of the second motor 226 is connected with the brush 156 of the first motor 124 as by a lead 268. Switch 264 remains open when both motors 124 and 226 are operating in their first or second speed modes under the control of switches 190 and 198 as aforesaid so that the brushes 256 and 258, the commutator 254 and the armature coil turns 252 connected therewith are electrically inoperable. When switch 264 is closed and switches 190 and 198 are open, system voltage is applied across brushes 256, 258, 156, 158, 160 and 162 in series so as to be distributed by commutator 250 across armature coil turns 252, by the commutator 150 across the armature coil turns 148 and by the commutator 154 across the armature coil turns 152. The portion of the voltage distributed across the armature coil turns 148 and 152 of the first motor 124 provides a total net back EMF and armature reaction interacting with the first magnetic field established by the permanent magnets 140 to cause the armature rotor assembly 142 to rotate and the first motor 124 to operate in a third speed mode. Moreover, during the third speed operating mode of motor 124 tap brush provides a second tap voltage which is applied across the brushes 260 and 262. The voltages applied across brushes 256 and 258 and across brushes 260 and 262 are distributed by commutators 250 and 254 to the armature coil turns 248 and 252 respectively to provide a total net back EMF and armature reaction interacting with the magnetic field established by permanent magnets 240 to cause the armature rotor assembly 242 to rotate and the motor 226 to operate in a third speed mode.

Because the embodiments of the present invention as described above implement a common electrical circuit including both motors in a dual motor system, it is not necessary to provide redundant radio frequency interference (RFI) suppression devices for each motor in the dual motor system. A single such device, made of conventional construction, is sufficient to eliminate radio frequency interference originating from both motors.

Figure 9:
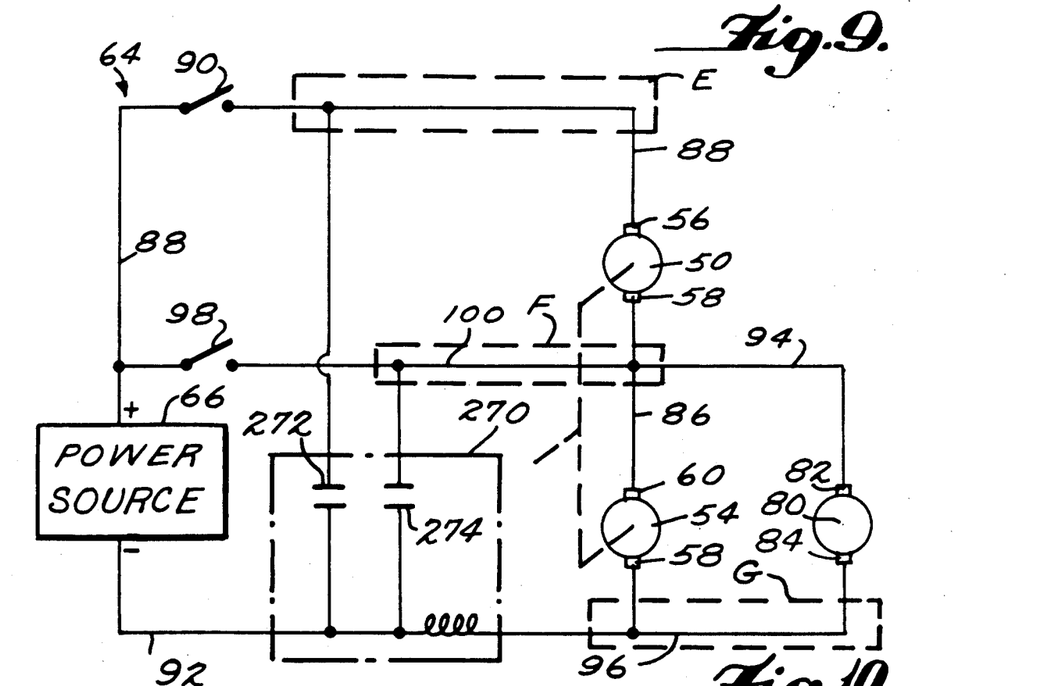
FIG. 9 is a schematic wiring diagram illustrating the circuitry of FIG. 2, together with a single device for suppressing radio frequency interference originating from both motors of the dual motor fan system of FIG. 1.

FIG. 9 illustrates the circuitry 64 of FIG. 2, together with a single RFI suppression device 270 for suppressing radio frequency interference originating from both motors 24 and 26 of FIG. 1. The RFI suppression device 270 added in FIG. 9 includes a first capacitor 272 connected between a node E associated with lead 88 and the lead 92 to the negative terminal of the DC power source 66, a second capacitor 274 connected between a node F associated with leads 100, 86 and 94 and the negative terminal of the DC power source 66, and an inductor 276 connected between a node G associated with leads 96 and 92 and the negative terminal of the DC power source 66. The inductor 276 is connected to receive the current flowing through armature coil turns 52, and also the current flowing through armature coil turns 78.

Figure 10:
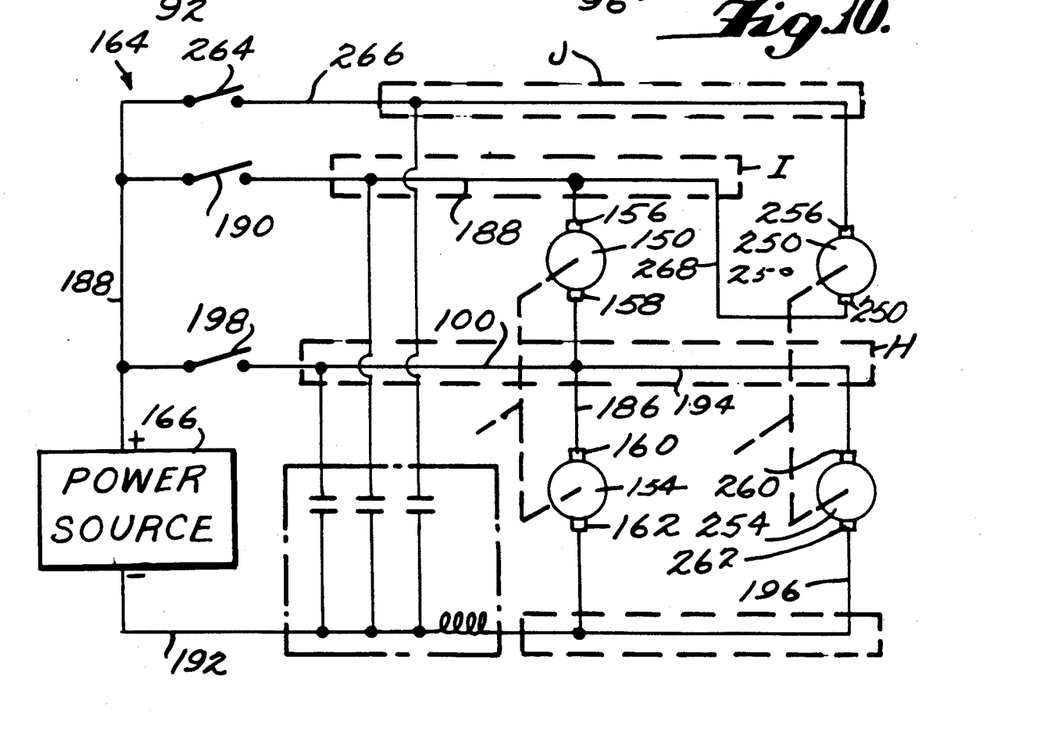
FIG. 10 is a view similar to FIG. 9 illustrating the circuitry shown in FIG. 8, together with a single device for suppressing radio frequency interference originating from both motors of the dual motor fan system of FIG. 7.

FIG. 10 illustrates the circuitry of FIG. 8, together with a single RFI suppression device 278 for suppressing radio frequency interference originating from both motors 124 and 226. The RFI suppression device 278 added in FIG. 10 includes a first capacitor 280 connected between a node H associated with leads 100, 186 and 194 and the negative terminal of the DC power source 166, a second capacitor 282 connected between a node I associated with the leads 188 and 268 and the negative terminal of the DC power source 166, a third capacitor 284 connected between a node J associated with the lead 266 and the negative terminal of the DC power source 166, and an inductor 286 connected between a node K associated with the leads 196 and 912 and the negative terminal of the DC power source 166. The inductor 286 is connected to receive the current flowing through armature coil turns 152, and also the current flowing through armature coil turns 252.

While the preferred embodiments of the inventions have disclosed the utilization of a dual wind two speed DC motor, other equivalent two speed DC motors may be utilized of the type providing tap brush means. One such equivalent motor is the well known two speed three-brush DC motor such as disclosed in U.S. Pat. No. 3,469,166. The third brush of a conventional two speed three brush motor provides the tap brush means which provides the tap voltage for application to the second motor. The dual wind two speed motor is preferred because of its better efficiency, particularly when operating in its second speed mode.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:
1. A two motor assembly for driving two fan blades to move air through a heat exchanger for an automotive engine comprising:
a first two speed DC motor comprising
means for establishing a first fixed magnetic motor field;
armature rotor means rotatable to drive a first fan blade;
a multiplicity of armature coil turns on said armature rotor means;
commutator means on said armature rotor means electrically connected with said multiplicity of armature coil turns and;
brush means including tap brush means cooperating with said commutator means to alternatively operate said first two speed DC motor (1) in a first speed mode wherein (A) a system voltage is applied and distributed across all of said multiplicity of armature coil turns to produce a net total back electro-motive force (EMF) and armature reaction interacting with said first magnetic field to cause said armature rotor means to rotate in said first speed mode and (B) a tap voltage intermediate the system voltage reduced across a predetermined number of armature coil turns less than all of the multiplicity of armature coil turns is provided through said tap brush means and (2) a different second speed mode;
a second DC motor including rotor means for driving a second fan blade and cooperating field means and armature coil means for rotating said rotor means;

and means for alternatively (1) applying said tap voltage across the armature coil means of said second DC motor so as to operate said second DC motor in a first speed mode when said first two speed DC motor is operated in the first speed mode thereof and (2) applying a system voltage across the armature coil means of said second DC motor so as to operate said second DC motor in a second speed mode when said first two speed DC motor is operated in said second speed mode.

2. A two motor assembly as defined in claim 1 wherein said commutator means includes two separate commutators, one of said two commutators being electrically connected to said predetermined number of armature coil turns, the other of said commutators being electrically connected with a remaining number of said multiplicity of armature coil turns which are not included in said predetermined number, said brush means including two sets of brushes, one set of which cooperates with said one commutator and includes one tap brush means, the other set of which cooperates with said other commutator and includes another tap brush means, said two sets of brushes being connected in series electrically through electrical connection of the tap brush means thereof, to apply the system voltage for distribution by said two commutators across all of said multiplicity of armature coil turns to cause said armature rotor means to rotate in said first speed mode with said tap brush means providing said tap voltage, said other set of brushes providing said different second speed mode by applying system voltage for distribution by said other commutator across said remaining number of armature coil turns to cause said armature rotor means to rotate in said second speed mode while said one set of brushes, said one commutator and said predetermined number of armature coil turns electrically connected thereto are electrically inoperable.

3. A two motor assembly as defined in claim 2 wherein said predetermined number of armature coil turns is less than one half of the total number of said multiplicity of armature coil turns.

4. A two motor assembly as defined in claim 3 wherein said predetermined number of armature coil turns is approximately one quarter of the total number of said multiplicity of armature coil turns.

5. A two motor assembly as defined in claim 4 wherein said voltage applying means includes two switches, one of which is operable to cause said first and second DC motors to operate in their respective first speed modes and the other of which is operable to cause said first and second DC motors to operate in their respective second speed modes.

6. A two motor assembly as defined in claim 5 wherein said first two speed DC motor includes means for suppressing radio frequency interference originating from said first two speed DC motor, and operable to suppress radio frequency interference originating from said second DC motor so as to eliminate the need to provide redundant radio frequency suppressing means for suppressing radio frequency interference originating from said second DC motor.

7. A two motor assembly as defined in claim 6 wherein said second DC motor comprises a second two speed DC motor, said field means being operable to establish a second fixed magnetic motor field, said rotor means comprising a second armature rotor means, said armature coil means comprising a multiplicity of second armature coil turns on said second armature rotor means, said alternative voltage applying means including two second commutators on said second armature rotor means, one of said two second commutators being electrically connected with a predetermined number of said second armature coil turns, the other of said two second commutators being electrically connected with a remaining number of said multiplicity of second armature coil turns which are not included in said predetermined number, and two sets of second brushes, one set of which cooperates with said one second commutator and the other set of which cooperates with said other second commutator to alternatively operate said second DC motor (1) in said first speed mode wherein said first mentioned tap voltage is applied through said other set of second brushes for distribution by said other second commutator across said remaining number of second armature coil turns to produce a net total back electromotive force and armature reaction interacting with said second magnetic field to cause said second armature rotor means to rotate in said first speed mode, (2) in said second speed mode wherein (A) the system voltage is applied through said other set of second brushes and distributed by said other second commutator across said remaining number of second armature coil turns to produce a net total back electro-motive force and armature reaction interacting with said second magnetic field to cause said second armature rotor means to rotate in said second speed mode, said voltage applying means being operable to operate said first and second motors in third speed modes wherein (1) the system voltage is applied across said predetermined number of second armature coil turns, and all of said multiplicity of first mentioned armature coil turns through said first-mentioned brush means (A) so that the voltage distributed by said first-mentioned commutator means across all of said multiplicity of said first-mentioned armature coil turns produces a net total back electro-motive force and armature reaction interacting with said first magnetic field to cause said first mentioned armature rotor means to rotate in a third speed mode and (B) so that a second tap voltage intermediate the system voltage reduced across said predetermined number of said second armature coil turns and said predetermined number of said first mentioned armature coil turns is provided through said tap brush means and (2) said second tap voltage is applied through said other set of second brushes and distributed by said other second commutator across the remaining number of said multiplicity of second armature coil turns to produce a net total back electro-motive force and armature reaction interacting with said second magnetic field to cause said second armature rotor means to rotate in a third speed mode.

8. A two motor assembly as defined in claim 1 wherein said predetermined number of armature coil turns is less than one half of the total number of said multiplicity of armature coil turns.

9. A two motor assembly as defined in claim 8 wherein said predetermined number of armature coil turns is approximately one quarter of the total number of said multiplicity of armature coil turns.

10. A two motor assembly as defined in claim 1 wherein said voltage applying means includes two switches, one of which is operable to cause said first and second DC motors to operate in their respective first speed modes and the other of which is operable to cause said first and second DC motors to operate in their respective second speed modes.

11. A two motor assembly as defined in claim 1 wherein said first two speed DC motor includes means for suppressing radio frequency interference originating from said first two speed DC motor, and operable to suppress radio frequency interference originating from said second DC motor so as to eliminate the need to provide separate radio frequency suppressing means for suppressing radio frequency interference originating from said second DC motor.

12. A two motor assembly as defined in claim 1 wherein said second DC motor comprises a second two speed DC motor, said field means being operable to establish a second fixed magnetic motor field, said rotor means comprising a second armature rotor means, said armature coil means comprising a multiplicity of second armature coil turns on said second armature rotor means, said alternative voltage applying means including two second commutators on said second armature rotor means, one of said two second commutators being electrically connected with a predetermined number of said second armature coil turns, the other of said two second commutators being electrically connected with a remaining number of said multiplicity of second armature coil turns which are not included in said predetermined number, and two sets of second brushes, one set of which cooperates with said one second commutator and the other set of which cooperates with said other second commutator to alternatively operate said second DC motor (1) in said first speed mode wherein said first mentioned tap voltage is applied through said other set of second brushes for distribution by said other second commutator across said remaining number of second armature coil turns to produce a net total back electro-motive force and armature reaction interacting with said second magnetic field to cause said second armature rotor means to rotate in said first speed mode, (2) in said second speed mode wherein (A) the system voltage is applied through said other set of second brushes and distributed by said other second commutator across said remaining number of second armature coil turns to produce a net total back electro-motive force and armature reaction interacting with said second magnetic field to cause said second armature rotor means to rotate in said second speed mode, said voltage applying means being operable to operate said first and second motors in third speed modes wherein (1) the system voltage is applied across said predetermined number of second armature coil turns and all of said multiplicity of first mentioned armature coil turns through said first-mentioned brush means (A) so that the voltage distributed by said first-mentioned commutator means across all of said multiplicity of said first-mentioned armature coil turns produces a net total back electro-motive force and armature reaction interacting with said first magnetic field to cause said first mentioned armature rotor means to rotate in a third speed mode and (B) so that a second tap voltage intermediate the system voltage reduced across said predetermined number of said second armature coil turns and said predetermined number of said first mentioned armature coil turns is provided through said tap brush means and (2) said second tap voltage is applied through said other set of second brushes and distributed by said other second commutator across the remaining number of said multiplicity of second armature coil turns to produce a net total back electro-motive force and armature reaction interacting with said second magnetic field to cause said second armature rotor means to rotate in a third speed mode.

13. A fan system for use in moving air through a heat exchanger for an automotive engine comprising
shroud means adapted to be operatively associated with the heat exchanger so as to receive air after it has passed through the heat exchanger,
said shroud means having air discharge opening means therein for allowing air received therein which has passed through the heat exchanger to be discharged therefrom,
separate first and second fan blade means mounted for separate rotational movement within said shroud means to cause air to flow into the shroud means through the heat exchanger and to flow out of the shroud means through the discharge opening means thereof,
a first two speed DC motor having armature rotor means rotatable to drive said first fan blade means, said first motor comprising
means for establishing a first fixed magnetic field;
a multiplicity of armature coil turns on said armature rotor means;
commutator means on said armature rotor means electrically connected with said multiplicity of armature coil turns and;
brush means including tap brush means cooperating with said commutator means to alternatively operate said first two speed DC motor (1) in a first speed mode wherein (A) a system voltage is applied and distributed across all of said multiplicity of armature coil turns to produce a net total back electro-motive force and armature reaction interacting with said first magnetic field to cause said armature rotor means to rotate in said first speed mode and (B) a tap voltage intermediate the system voltage reduced across a predetermined number of armature coil turns less than the entire multiplicity of armature coil turns is produced through said tap brush means and (2) a different second speed mode;
a second DC motor including rotor means rotatable to drive said second fan blade means and cooperating field means and armature coil means for rotating said rotor means;
and means for alternatively (1) applying said tap voltage across the armature coil means of said second DC motor so as to operate said second DC motor in a first speed mode when said first two speed DC motor is operated in the first speed mode thereof and (2) applying a system voltage across the armature coil means of said second DC motor so as to operate said second DC motor in a second speed mode when said first two speed DC motor is operated in said second speed mode.

14. A fan system as defined in claim 13 wherein said commutator means includes two separate commutators, one of said two commutators being electrically connected to said predetermined number of armature coil turns, the other of said commutators being electrically connected with a remaining number of said multiplicity of armature coil turns which are not included in said predetermined number, said brush means including two sets of brushes, one set of which cooperates with said one commutator and includes one tap brush means, the other set of which cooperates with said other commutator and includes other tap brush means, said two sets of brushes being connected in series electrically through electrical connection of the tap brush means thereof to apply the system voltage for distribution by said two commutators across all of said multiplicity of armature coil turns to cause said armature rotor means to rotate in said first speed mode with the tap brush means providing said tap voltage, said other set of brushes providing said different second speed mode by applying system voltage for distribution by said other commutator across said remaining number of armature coil turns to cause said armature rotor means to rotate in said second speed mode while said one set of brushes, said one commutator and said predetermined number of armature coil turns electrically connected thereto are electrically inoperable.

15. A fan system as defined in claim 13 wherein said predetermined number of armature coil turns is less than one half of the total number of said multiplicity of armature coil turns.

16. A fan system as defined in claim 15 wherein said predetermined number of armature coil turns is approximately one quarter of the total number of said multiplicity of armature coil turns.

17. A fan system as defined in claim 13 wherein said voltage applying means includes two switches, one of which is operable to cause said first and second DC motors to operate in their respective first speed modes and the other of which is operable to cause said first and second DC motors to operate in their respective second speed modes.

18. A fan system as defined in claim 17 wherein said shroud means includes means for providing a first flow path within said shroud means for said first fan blade means and a separate second flow path within said shroud means for said second fan blade means, said voltage applying means including further switches for independently controlling the operation of said first and second DC motors separately.

19. A fan system as defined in claim 13 wherein said first two speed DC motor includes means for suppressing radio frequency interference originating from said first two speed DC motor, and operable to suppress radio frequency interference originating from said second DC motor so as to eliminate the need to provide separate radio frequency suppressing means for suppressing radio frequency interference originating from said second DC motor.

20. A fan system as defined in claim 13 wherein said second DC motor comprises a second two speed DC motor, said field means being operable to establish a second fixed magnetic motor field, said rotor means comprising a second armature rotor means, said second armature coil means comprising a multiplicity of second armature coil turns on said second armature rotor means, said alternative voltage applying means including two second commutators on said second armature rotor means, one of said two second commutators being electrically connected with a predetermined number of said second armature coil turns, the other of said two second commutators being electrically connected with a remaining number of said multiplicity of second armature coil turns which are not included in said predetermined number, and two sets of second brushes, one set of which cooperates with said one second commutator and the other set of which cooperates with said other second commutator to alternatively operate said second DC motor (1) in said first speed mode wherein said first mentioned tap voltage is applied through said other set of second brushes for distribution by said other second commutator across said remaining number of second armature coil turns to produce a net total back electromotive force and armature reaction interacting with said second magnetic field to cause said second armature rotor means to rotate in said first speed mode, (2) in said second speed mode wherein (A) the system voltage is applied through said other set of second brushes and distributed by said other second commutators across said remaining number of second armature coil turns to produce a net total back electro-motive force and armature reaction interacting with said second magnetic field to cause said second armature rotor means to rotate in said second speed mode, said voltage applying means being operable to operate said first and second motors in third speed modes wherein (1) the system voltage is applied across said predetermined number of second armature coil turns, and all of said multiplicity of first mentioned armature coil turns through said first-mentioned brush means (A) so that the voltage distributed by said first-mentioned commutator means across all of said multiplicity of said first-mentioned armature coil turns produces a net total back electro-motive force and armature reaction interacting with said first magnetic field to cause said first mentioned armature rotor means to rotate in a third speed mode and (B) so that a second tap voltage intermediate the system voltage reduced across said predetermined number of said second armature coil turns and said predetermined number of said first mentioned armature coil turns is provided through said tap brush means and (2) said second tap voltage is applied through said other set of second brushes and distributed by said other second commutator across the remaining number of said multiplicity of second armature coil turns to produce a net total back electro-motive force and armature reaction interacting with said second magnetic field to cause said second armature rotor means to rotate in a third speed mode.

* * * * *